United States Patent [19]

Pemberton et al.

[11] Patent Number: 5,415,316

[45] Date of Patent: May 16, 1995

[54] FUEL TANK WITH A RECESSED FILL CAP

[75] Inventors: Clifford H. Pemberton, Warren; Robert M. Farmer, Macomb, both of Mich.

[73] Assignee: C&V Leasing, Inc., Southfield, Mich.

[21] Appl. No.: 114,672

[22] Filed: Aug. 31, 1993

[51] Int. Cl.$^6$ ............................................. B65D 41/04
[52] U.S. Cl. ................................ 220/562; 220/288; 220/465
[58] Field of Search .............. 220/562, 1.5, 4.13, 220/4.05, 4.06, 288, 293, 410, 465; 220/288, 465, 562

[56] References Cited

U.S. PATENT DOCUMENTS

| | | | |
|---|---|---|---|
| 2,866,572 | 12/1958 | Llewhellin | 220/293 |
| 3,871,549 | 3/1975 | Kerr | 220/288 |
| 4,164,304 | 8/1979 | Roberson | 220/288 X |
| 4,280,434 | 7/1981 | Beckerer, Jr. | 220/288 X |
| 4,357,027 | 11/1982 | Zeitlow | 280/5 |
| 4,393,980 | 7/1983 | Armour et al. | 220/85 |
| 4,449,723 | 5/1984 | Shiratsuchi | 280/5 |
| 4,469,190 | 9/1984 | Yamaguchi | 180/219 |
| 4,511,105 | 4/1985 | Morrisey | 244/135 |
| 4,513,875 | 4/1985 | Kuehn, Sr. | 220/4.13 X |
| 4,588,103 | 5/1986 | Baughman | 220/288 |
| 4,620,641 | 11/1986 | Beer | 220/288 |
| 4,759,459 | 7/1988 | Bailey et al. | 220/86 |
| 4,930,648 | 6/1990 | Hundt | 220/1.5 X |
| 5,154,308 | 10/1992 | Larson | 220/465 X |
| 5,199,570 | 4/1993 | McKenzie | 220/4.05 X |

*Primary Examiner*—Steven M. Pollard
*Attorney, Agent, or Firm*—Brooks & Kushman

[57] ABSTRACT

A fuel tank comprises a rotationally molded tank wall having a recessed neck unitarily formed with the tank wall during the rotational molding process. The neck receives a correspondingly threaded cap so that a top surface of the cap remains substantially at the level of the tank wall surface when a stem on the cap is threadedly engaged in the correspondingly threaded neck of the tank. In addition, a process for recessing a fill cap in a fuel tank comprises rotational molding of a plastic powder to form a hollow body within at least two mold parts. An insert carried by the one of the mold parts forms a threaded neck recessed inwardly from the tank wall surface. In addition, the process molds a cap with a handle having a top surface at the level of the tank wall surface.

18 Claims, 1 Drawing Sheet

U.S. Patent    May 16, 1995    5,415,316
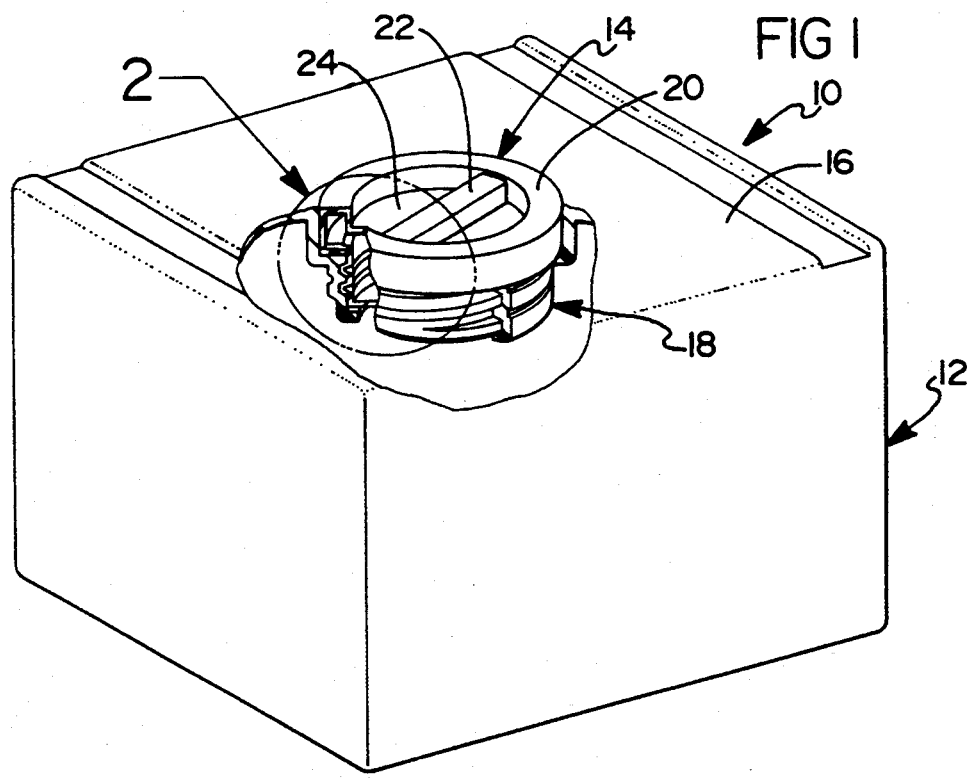
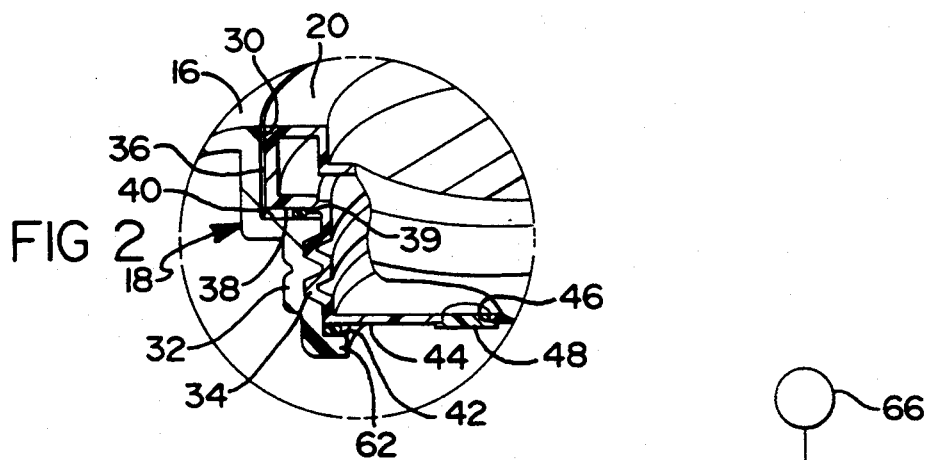
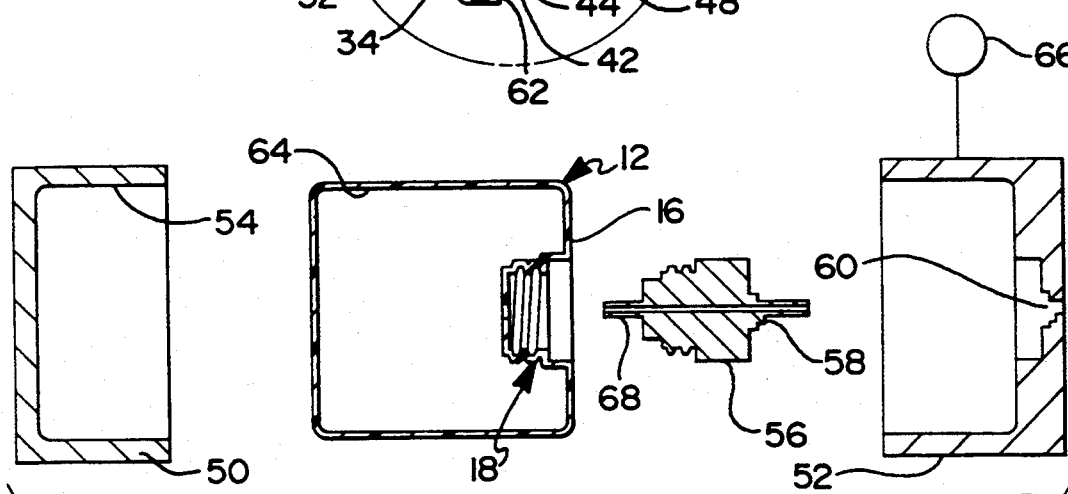

FUEL TANK WITH A RECESSED FILL CAP

BACKGROUND OF THE INVENTION

1. Field of the Invention

The present relates generally to fuel tanks for motor vehicles, and more particularly to plastic powder, rotational molded tanks having a recessed filler neck for positioning the cap flush with the exterior surface of the fuel tank.

2. Background Art

Receptacles for containment of flammable fuels, particularly in regard to motor vehicles such as boats, automobiles or aircraft, require substantial integrity to avoid leakage and from seams, fittings and wall areas, particularly during deformation of fuel tanks upon impact of a motor vehicle. Resilient materials such as plastics have been used to replace the traditional metal fuel tank structures where the integrity of the walls and the seams that join the walls was at risk. These materials have been advantageously employed in tanks supplied for racing vehicles where the opportunity for high speed impacts is enhanced. However, fill closures or valves for the tanks have not previously been implemented with the materials used to form the tanks. In particular, economy valves, fast fill valves and regular fill fittings are generally mounted onto the top surface of the fuel tank, generally in a manner protruding above the top exterior surface of the tank.

Typically, the previously known tank structures are completed by installing a separately fabricated fuel inlet attachment. Some of these inlets include a neck portion recessed below the top surface of the tank at an edge of an opening in the top tank surface formed to receive the inlet or valve. However, such necks depend from an annular flange which must be retained by bolting or the like to the tank wall surrounding the peripheral edge of the opening. Accordingly, the mounting structure of these previously known recessed necks still include protrusions such as bolts, nuts, flanges and any handles on the caps, even though a large portion of the cap is received within the recessed neck. These protrusions form an obstruction during shifting movement of the tank or forced engagement with other motor vehicle parts which may come in contact with the tank during uncontrolled vehicle movement.

Moreover, the separate mounting of a fill neck or valve onto the fuel tank walls forms a seam or interface which is subject to leakage even under normal usage. In particular, the use of bolts to secure a mounting flange to the top surface of the plastic tank imposes inconsistent pressures to the flange and the supporting wall portion of the fuel tank as well as any seals interposed between mating surfaces around the entire periphery of the valve opening. As a result, under particularly stressed or strained conditions, the uneven application of pressure around the opening may contribute to leakage between the part as well as actual rupturing of the parts of the connection between the attached or adjacent parts.

SUMMARY OF THE INVENTION

The present invention overcomes the above-mentioned disadvantages by providing a fuel tank having a molded body portion including a unitary recessed neck that receives a cap below the top surface of the tank so that the uppermost surface of the cap is at the level of the exterior surface of the tank. In general, a plastic powder, rotational molding process forms a hollow tank body. The body includes a recessed neck preferably with a threaded tube portion, which is adapted to support a cap. Preferably, the cap is molded in a similar process to include a correspondingly threaded stem to fit the threaded tube portion of the neck. In addition, complete engagement of the cap in the neck positions the top of the cap at the level of the exterior surface of the fuel tank.

In the preferred embodiment, the neck includes at least one shoulder, and preferably a pair of shoulders, that registers for mating engagement with a corresponding number of shoulders on the cap, to construct a seal around the cap. The seal may be completed by a sealing membrane, for example a resilient O-ring, carried or inserted between mating shoulder surfaces. Preferably, the cap is also plastic powder molded. Thus, the present invention provides an advantageous seamless tank construction having a recessed filler neck which is not prone to leakage. Moreover, the entire cap portion is recessed and does not require any protruding cap or mounting hardware protrusions which can obstruct the smooth exterior of the fuel cell.

In addition, the present invention provides the advantage of a simple molding operation to form a tank body with a recessed neck extending inwardly from a tank wall surface in a single mold. Preferably, at least two, and preferably only two, mold parts form the mold cavity, and an insert is carried by one of the mold parts to form the recessed neck. Similarly, a simple pair of mold parts can be used to form the cap. Preferably, the mold portion or mold insert including the helical track for forming threads may be disengaged from the molded part by relative rotation of the tank cap and the mold part when the molded material has cured. In the preferred embodiment, the cap is formed with a handle extending along the top surface of the cap from a recessed wall. The molded part is easily removed from the mold by lateral displacement of the mold part from the molded part.

BRIEF DESCRIPTION OF THE DRAWING

The present invention will more clearly understood by reference to the following detailed description of a preferred embodiment, when read in conjunction with the accompanying drawing, in which like reference characters refer to like parts throughout the views and in which:

FIG. 1 is a perspective view of the fuel tank constructed in accordance with the present invention;

FIG. 2 is an enlarged sectional view of a portion of the tank shown in FIG. 1; and FIG. 3 is an exploded sectional view of mold parts and the molded part employed in a molding process according to the present invention.

DETAILED DESCRIPTION OF THE PREFERRED EMBODIMENT

Referring first to FIG. 1, a fuel tank 10 according to the present invention is there shown having a body 12 made in one piece with a plastic powder rotational molding process. In summary, such a process distributes powder throughout an enclosed, heated mold cavity by bi-axially rotating the heated mold parts, preferably about two orthoganal axes. Such a process forms a substantially uniform wall layer over the mold walls confining the cavity to make a hollow, enclosed body, or as desired, a hollow body with particularly sized openings formed by, for example, hole-sawing, the molding process or other desired operation. Moreover, outer corners of a body, for example, a rectangular body, formed in the process may be strengthened by the thickening that can occur at such corners.

The tank 12 includes a surface 16, preferably a top surface, in which a recessed neck 18 is unitarily formed with at least a portion of the tank body 12. Furthermore, it is preferred that the entire tank is formed as a unitary piece to include the recessed neck 18 and avoid any seams that would be highly susceptible to rupturing or leakage. This preferred construction provides numerous advantages including the advantage that the resin melts in the mold rather than being forced under pressure into the mold in a molten state. The mold parts are less expensive because of their simplicity, and operating pressures are relatively low, permitting the molds to be made from less expensive materials. Nevertheless it is to be understood that the tank 12 could be formed in portions, for example upper and lower halves, in accordance with the present invention, provided that the neck is formed in unitary construction with a body wall with a recessed threaded tubular portion.

In addition, the neck 18 receives the cap 14 so that uppermost surface 20 of the cap 14 is substantially at the level of the upper surface 16, and most preferably, flush with the top surface 16. Preferably, the cap 14 is also rotationally molded with plastic powder for the ease and simplicity as described above with respect to construction of the tank. Of course, other caps and cap molding techniques can also be used in practicing the present invention. In any event, the cap 14 is provided with a handle, such as the elongated rib 22 which extends upwardly from a recessed wall surface 24. The top of the handle 22 and the top surface 20 do not extend upward substantially beyond the top surface 16 of the tank 10.

Referring to FIG. 2, the cap 14 is particularly configured for mating engagement in the neck 18. Accordingly, the neck includes a head recessing portion 30 and a threaded tube portion 32 below the head recessing portion 30. The cap 14 includes a threaded stem 34 correspondingly threaded to the threaded tube 32 of the neck 18. Accordingly, the radially enlarged head 36 includes the top surface 20 of the cap 14 and a radially extending shoulder 38 that registers with a radially extending wall 40 on the neck 18. In addition, the neck 18 includes a second shoulder 42 registering with a shoulder 44 on the cap 14, for example, the bottom wall of the cap 14.

Seal members, for example, conventional fuel resistant O-rings 46 and 48 respectively, such as a rubber gasket or buna-plastic for a gasoline fuel tank, may be interposed between the registering shoulders 38, 40 and 42, 44 and may be retained thereon by any appropriate coupling. Alternatively, seal rings may be formed as annular ribs on one of the walls forming the shoulder or rings may be received in mounting grooves on the molded parts. The seals may also be retained in other appropriate manners such as gluing or resilient engagement against the part, for example, stretched around the base of the cap stem, against a radially adjacent shoulder 39. In any event, the cap 14 and the neck 18, and their mating shoulders are longitudinally spaced by an appropriate dimension to accommodate the seals when they are used so that no surfaces of the cap 14 protrude a substantial distance above the top surface 16 of the tank body 12 when the cap 14 is fully installed in the neck 18.

Moreover, the cap 14 includes a handle which can be formed as any means for installing and removing the cap from its mating position in the neck 18, and the cap 14 sealingly engages the neck 18 so as to prevent leakage of any fluid contained within the tank 10. As also shown in FIG. 2, an opening 46 formed by a vent pipe inserted in the mold as described below is sealed by a plug 48 spin-welded into the opening 46.

The simplicity of the rotary molding process, preferably employed to make both the cap and the fuel tank, and the simplicity of the resulting molded structures, is demonstrated in FIG. 3. In particular, two mold parts 50 and 52 are locked together in a conventional manner such as to form an enclosed molding cavity 54. In addition, one of the mold parts carries an insert 54 externally configured to form the neck 18 including the head receiving recess 30 and the threaded tube 32. The insert 56 is located and locked in registration with one of the mold parts in a conventional manner, for example, mounted to mold part 52, as diagrammatically indicated at interlocking alignment members 58 and 60 in FIG. 3.

Moreover, one of the mold parts carries a vent pipe 68, preferably, in the form of a teflon tube filled with fiberglass to avoid release of the powder. The tube resists accumulation of the plastic powder at the temperatures involved and vents the mold chamber to reduce the stresses and deformations that may result from expansion and contractions during heating and cooling of the mold and the molded part. Such venting aids the dimensional integrity and strength of the molded part as it forms along the complex shaped mold wall areas. For example, the threaded stem of the cap being molded.

The mold wall surfaces may be treated by a release agent to avoid warp, for example, a liquid teflon-based mold release or a metallic soap powder. The assembled mold parts are then positioned in a rotation molding apparatus which biaxially rotates the closed mold under conventional heating conditions for the selected mold material, for example, in an oven heated to 525° F. for 15 minutes when polyethylene powder, for example, Exxon LL8361.27 linear low density powder sized at 35 mesh is contained in the mold. Accordingly, the rotation molding apparatus operates in well known manner to form a layer of plastic material around the wall of the mold cavity 54. Moreover, while changes in these parameters may be made, for example, holding oven temperatures below 700° F. and for shorter period to avoid excessive warping during cooling, the wall forms an enclosed tank 12 or a hollow body cap 14, as shown in FIGS. 1 and 2. In addition, the powder may be varied as desired, for example, MA 530–660 high density polyethylene from Quantum Chemical may be molded with appropriately adjusted temperature and molding times.

The body 12 may then be removed from the mold parts after the molding operation, whereby an opening 62 formed by a hole saw removes the vent hole opening 46 while enlarging the neck opening 62 to permit access into the tank chamber for assembly of accessories such as roll over vents. The opening 62 is peripherally defined by the shoulder 42 in the preferred embodiment. The opening 62 at the lower end of the neck 18 also permits fluids such as fuel to be introduced to the tank chamber 64. Of course, additional details of the mold parts and the molding process will be well known from other rotational molding publications, for example, Rotational Molding Operating Manual published by the Quantum Chemical Corporation, U. S. I. Division, Copyright 1990, incorporated by reference. The formed layer has a substantially uniform wall thickness preferably of about ¼ inch, and approximately ⅜ of an inch deep threads around the neck portion 18.

Of course, numerous other materials can also be molded in a rotational molding process. For example, polycarbonate, nylon, polyvinyl chloride, polyesters, polypropylene may also be used as desired. In addition, ABS, acetals, acrylics, cellulosics, epoxy, fluorocarbons, phenolics, polybutylene, polystyrene, polyurethane and silicone may be also be employed in rotational molding techniques to form fuel tanks in accordance with the present invention.

In any event, the present invention provides a simple and convenient structure for fuel tanks which avoids protrusions that can obstruct the passage of moving or deforming vehicle members when subjected to substantial impacts, and thereby reduce the risk of rupturing. Moreover, the present invention prevents against leakage between parts which react to temperature, fluid pressure or mechanical forces with different degrees of resiliency, and provides a fluid tight container for fluids, particularly volatile fluid such as racing fuel. In addition, the tanks may be provided with fuel cell accessories previously known in the art such as roll-over vent and hose fitting kits such as Product No. 90921 or other of R. J. S. Safety Equipment, Inc. fuel accessories such as sender units or the like. Moreover, the mounting platforms formed on the tanks for these items may also be recessed inwardly from the exterior tank surface in the manner taught by the present invention. Moreover, by using particular materials such as polyethylene, the tank is provided with sufficient structural resilience and deformation characteristics that it expands and contracts well under a variety of temperature conditions.

Having thus described the present invention, many modifications thereto will become apparent to those skilled in the art to which it pertains without departing from the scope and spirit of the present invention as defined in the appended claims.

What is claimed is:

1. A fuel tank comprising:
   a unitary molded plastic fuel tank body with a recessed threaded neck extending below an external body surface formed in a plastic powder rotation molding process, wherein said neck includes a threaded tube;
   a cap having a stem correspondingly threaded for engagement in said threaded tube, and a top surface carried at the level of said external body surface when said stem is threadedly engaged in said threaded tube such that said cap top surface lies in a plane common with said external body surface when said cap is threaded into said threaded neck.

2. The invention as defined in claim 1 wherein said cap is a unitary molded body formed in a plastic powder molding process.

3. The invention as defined in claim 1 wherein said cap comprises a head surface and a handle formed across said head surface.

4. The invention as defined in claim 3 wherein said handle comprises a protrusion extending from head surface.

5. The invention as defined in claim 4 wherein said top surface comprises the top of said protrusion.

6. The invention as defined in claim 3 wherein said handle comprises an elongated socket.

7. The invention as defined in claim 1 wherein said cap includes a radially expanding head above said stem and wherein said tank neck includes a radially expanded shoulder above said threaded tube.

8. The invention as defined in claim 7 wherein said radially expanded head includes a shoulder registering with said neck shoulder.

9. The invention as defined in claim 8 and further comprising a seal intermediate said cap shoulder and said neck shoulder.

10. The invention as defined in claim 1 wherein said neck includes a shoulder at the bottom of said threaded tube and wherein said cap includes a shoulder surface in registration with said neck shoulder.

11. The invention as defined in claim 10 and further comprising a seal intermediate said cap shoulder and said neck shoulder.

12. A process for recessing a fill cap in a fuel tank comprising:
   plastic powder molding a unitary hollow plastic fuel tank body within at least two mold parts, at least one of said mold parts carrying an insert shaped to form a recessed threaded neck in said unitary body and extending inwardly from a tank wall surface; and
   molding a cap having a threaded stem correspondingly threaded to said neck, and having a handle with a top surface at the level of said tank wall surface such that said cap top surface lies in a plane common with said external body surface when said cap is threaded into said threaded neck.

13. The invention as defined in claim 12 wherein said plastic powder molding step comprises spacing said threaded neck at a recessed position from said tank wall surface.

14. The invention as defined in claim 12 wherein said cap molding step comprises plastic powder molding.

15. The invention as defined in claim 12 wherein said plastic powder molding step and said cap molding step comprise forming at least one cap shoulder registering with a tank shoulder on said cap and said tank, respectively.

16. The invention as defined in claim 15 and further comprising inserting a seal between said cap shoulder and said tank shoulder.

17. The invention as defined in claim 12 and further comprising molding a second cap shoulder and a second tank shoulder in registration with each other on said cap and said tank, respectively.

18. The invention as defined in claim 12 wherein said plastic powder molding step comprises inserting polyethylene beads in said mold parts.

* * * * *

UNITED STATES PATENT AND TRADEMARK OFFICE
CERTIFICATE OF CORRECTION

PATENT NO. : 5,415,316

DATED : May 16, 1995

INVENTOR(S) : Pemberton et al.

It is certified that error appears in the above-identified patent and that said Letters Patent is hereby corrected as shown below:

Claim 12 - Column 6, line 33: After "unitary" insert --hollow--.

Signed and Sealed this

Twenty-ninth Day of August, 1995

Attest:

BRUCE LEHMAN

Attesting Officer

Commissioner of Patents and Trademarks